Oct. 4, 1932. F. E. WINCHESTER ET AL 1,881,009
VEHICLE BRAKE
Filed Oct. 9, 1930 3 Sheets-Sheet 1
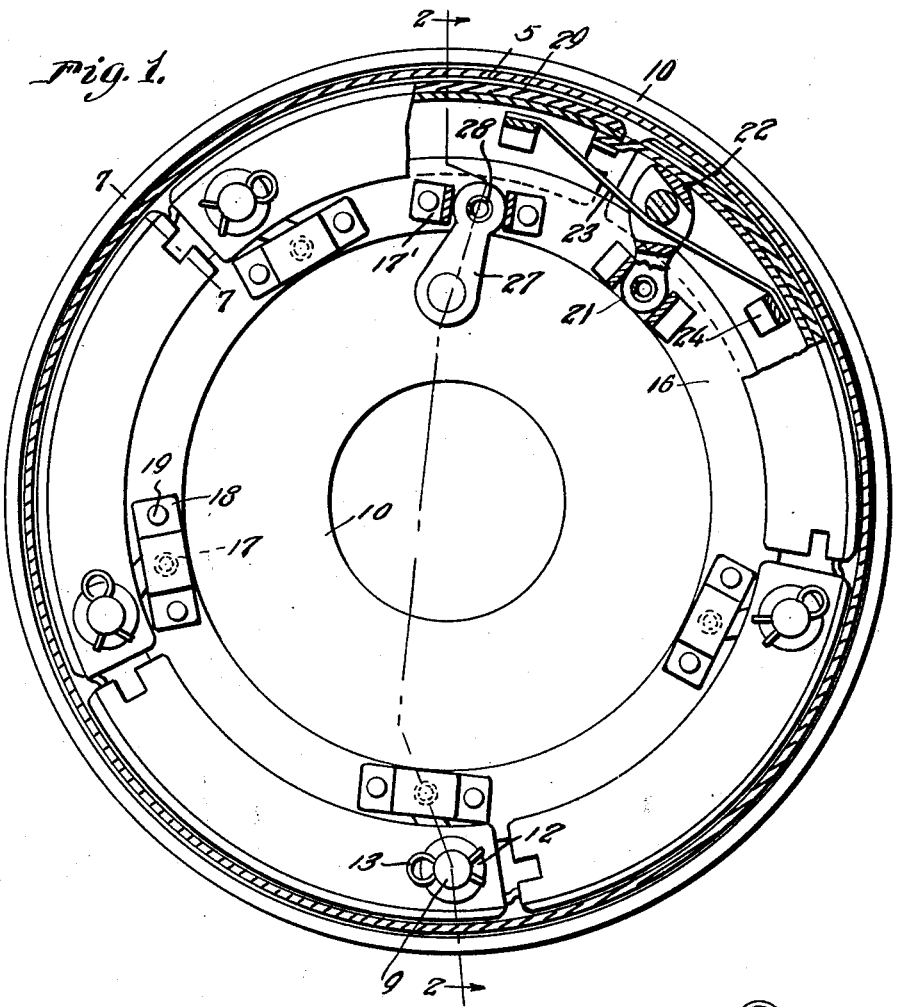
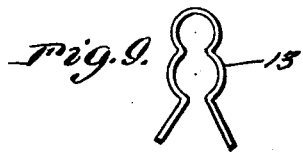
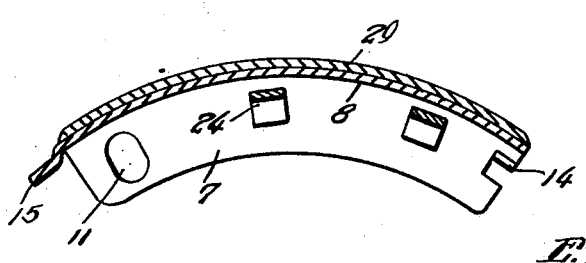
Inventors
F. B. Thomas
F. E. Winchester
By Clarence A. O'Brien
Attorney Oct. 4, 1932.  F. E. WINCHESTER ET AL  1,881,009
VEHICLE BRAKE
Filed Oct. 9, 1930  3 Sheets-Sheet 2

Inventors
L. B. Thomas
F. E. Winchester
By Clarence A. O'Brien
Attorney

Patented Oct. 4, 1932

1,881,009

UNITED STATES PATENT OFFICE

F. EARL WINCHESTER AND EDGAR B. THOMAS, OF CONNERSVILLE, INDIANA

VEHICLE BRAKE

Application filed October 9, 1930. Serial No. 487,580.

This invention relates to certain new and useful improvements in brakes and has more particular reference to a brake especially adapted for use in conjunction with vehicles.

A primary object of the invention is to provide a brake having a plurality of brake shoes adapted to uniformally contact with the brake drum to present a braking surface of 90 per cent or more as compared to the average type of brake which affords 60 to 70 percent of braking surface, inasmuch as the power in such types of brakes is applied at one end of the shoe, which does not effect a uniform contact.

A still further object of the invention is to provide a brake of this character, which, after the linings are burned in or shaped to the exact diameter of the brake drum, need only be adjusted to a 0.005 clearance at any point, whereby may be obtained a uniform clearance at the entire circumference of the brake, and which will not require any further adjustments until the linings are worn out, except adjustments of the foot pedal itself, in case the pedal reaches the full travel and stops on the toe board.

Other objects and advantages of the invention will become apparent during a study of the following description, taken in connection with the accompanying drawings, wherein:

Figure 1 is a plan view of the improved device, certain parts being shown broken away and in section.

Figure 3 is a longitudinal sectional view, taken on one of the segmental brake shoes.

Figure 9 is a view of a detail.

Figure 2:
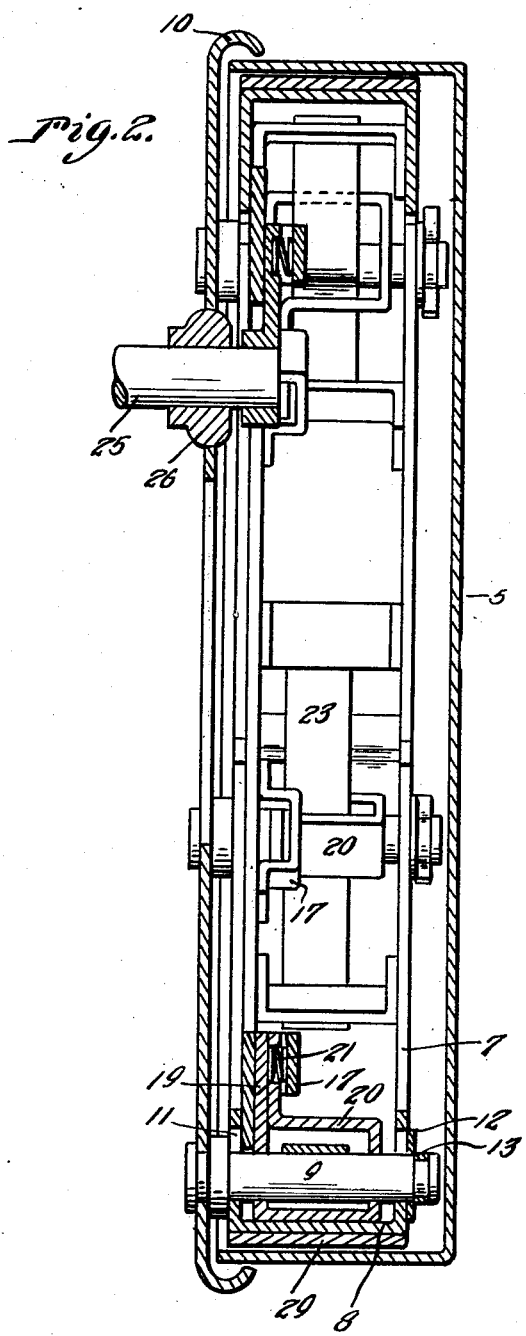
Figure 2 is a vertical sectional view, taken substantially on the line 2—2 of Figure 1.
Figure 7:
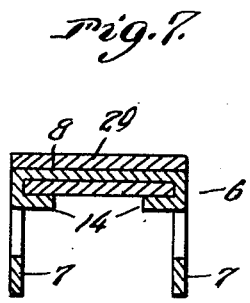
Figure 7 is a detail sectional view, taken substantially on the line 7—7 of Figure 1.
Figure 8:
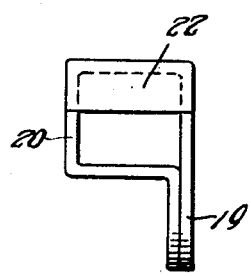
Figure 8 is an elevational view of a cam forming part of the invention.
Figure 4:
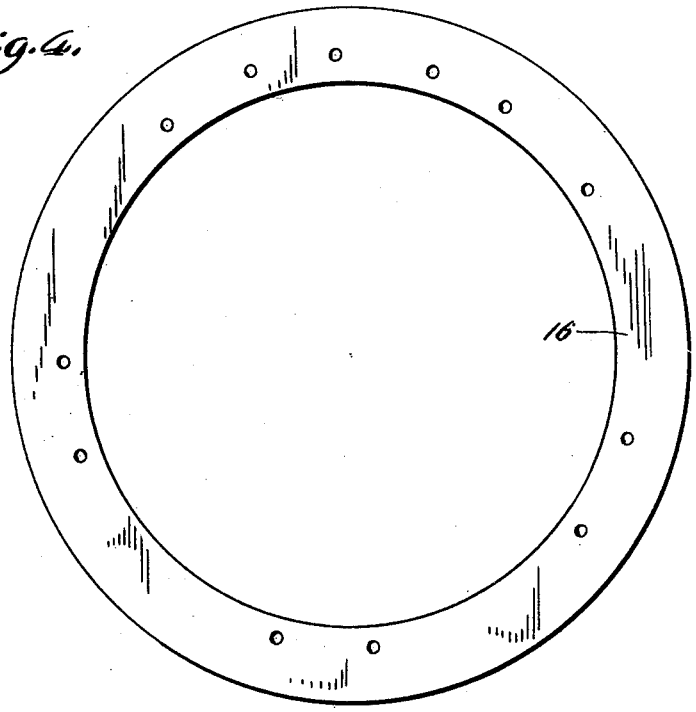
Figure 4 is a plan view of the floating or rotatable ring.
Figure 5:
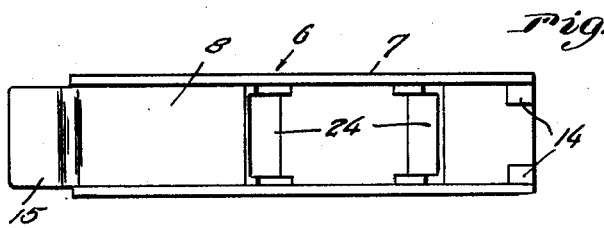
Figure 5 is a bottom plan view of a segmental brake shoe.
Figure 6:
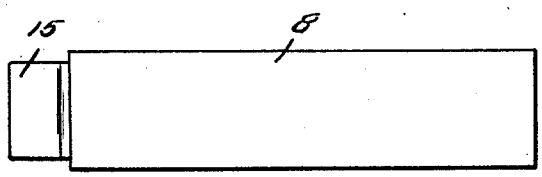
Figure 6 is a top plan view thereof.

With reference more in detail to the drawings, it will be seen that 5 designates a brake drum, within which is arranged a plurality of brake shoes, designated generally by the reference character 6.

The brake shoes are segmental or arcuate, and are so arranged within the drum 5 as to define a somewhat substantially annular brake shoe.

Each of the segmental brake shoes 6 are identical in construction, and preferably, in the contemplation of the invention there are five of such segmental brake shoes 6. Each of the brake shoes 6 is substantially channel shaped in cross section and open at its opposite ends. The sides of the brake shoes are designated by the reference character 7, and the top or connecting web between the walls 7 designated by the reference character 8. Each of the brake shoes 6 is pivotally mounted, at one end thereof on a stud bolt 9. The stud bolts 9 are carried by an end plate 10, normally closing the open side of the brake drum 5. The studs 9 are arranged in circumferential spaced relation on the plate 10 and extend inwardly of the drum 5. The plate 10 acts as a support for the brake and also as a dust and grease guard. The plate 10 is adapted to be mounted on the axle of the vehicle, in any suitable or well known manner for supporting the brake. The stud bolts 9 are secured at one end to the plate 10, in any suitable manner.

The stud 9 extends through the transversely aligned elongated openings 11, formed in the sides 7 of the brake shoe at one end of the brake shoe.

On the free end of the stud 9 is a suitable washer 12, and a suitable pin 13 of the shape and construction shown in Figure 9 of the drawings, engages the free end of the stud, in a manner similar to a cotter pin, for retaining the washer 12 in position between the pin and the adjacent side of the brake shoe.

Each of the shoes 6 at its pivoted end, has a tongue 14 punched inwardly thereof from each side wall 7. Each of the brake shoes 6 at the free end thereof has a lip or offset extension 15, extending longitudinally thereof, and integral with the web 8 of the shoe. When the shoes 6 are arranged in the manner suggested in Figure 1, it will be seen that the lips 15 of the shoes are engaged by the tongues or clips 14 of the next adjacent shoe which makes for a continuous brake shoe, the entire surface of the brake drum. The lips or flanges 15 are of course of such a width as to extend between the sides 7 and between the clips 14 and the web 8 of the next adjacent brake shoe.

Arranged within the brake drum 5 and arranged within the confines of the annular brake shoe formed by the segmental brake shoes 6 is a ring 16. The ring 16 has secured thereto a plurality of circumferentially spaced substantially U-shaped brackets 17. The brackets 17 have flanged ends or lugs 18, spot welded or otherwise secured to the ring 16 as at 19.

There is one of such brackets 17 for each of the segmental brake shoes 6, and the brackets 17 are so arranged on the drum as to be adjacent the pivoted ends of the brake shoes 6. Carried by each of the brackets 17 is a cam member, which includes a shank portion 19, and a somewhat shell like head 20. The head 20 extends inwardly between the side walls 7 of the brake shoe and at the opposite ends thereof the head 20 is provided with suitable openings for accommodating a stud bolt 9, for pivotally supporting the head 20. The shank 19 of the cam is arranged in the bracket 17, and is retained in said bracket against rattling through the medium of a spring 21, which extends into a suitable socket provided in the shank 19 and bears against an intermediate portion of the bracket 17. The head 20 of the cam member is provided with a cam face 22, adapted to bear against the inner side of the wear face of the brake shoe, when the cam member is rocked in a manner to be hereinafter made manifest.

The segmental brake shoes 6 are held rigid against the cam faces 22, of the cam members when the shoes are in a released position, that is, in a position out of engagement with the brake drum, through the medium of flat steel springs 23, which extend through the heads 20 of the cams, the intermediate portion of the springs 23 bearing against the bolts 9, and the ends of the springs engaged with retaining members 24, arranged in the shoes 6, said lugs 24 being welded or otherwise secured at its ends to the walls 7 of the shoe.

A bracket 17' similar to the bracket 17 is also secured to the ring 16. An operating shaft 25 is adapted to be operatively connected to the brake pedal of the vehicle, has one end portion journalled in a bearing 26, carried by the plate 10, and extends inwardly of the drum 5. On the inner end of the shaft 25 is a bell crank 27, that has its free end retained in the bracket 17 through the medium of a suitable coil spring 28.

In operation, when the brake is in a released position, the parts are normally in that position suggested in Figure 1.

To apply the brakes, rocking movement is imparted to the shaft 25, by pressing on the brake pedal (not shown) with which the shaft 25 has suitable operating connection (not shown). The shaft 25 being so rocked will, through the medium of the crank arm 27 connected to the ring 16, rotate the ring 16 in a suitable direction, which in turn will rock the cam simultaneously, thus forcing the pivoted ends of the brake shoes into frictional contact with the peripheral walls of the brake drum 5, and the floating or free ends of the brake shoes being operatively connected with the pivoted end of the next adjacent brake shoe will also force said floating end of the brake shoes to be moved into frictional engagement with the peripheral wall of the brake drum, so that the web or top portion 8 of each brake shoe for the entire length of the brake shoe will be brought into frictional engagement with the periphery of the drum, thus insuring a uniform contact of the brake shoes with the drum, in applying a braking action.

Of course, the web or top portion 8 of each of the brake shoes exteriorly of the brake shoe will be provided with a suitable asbestos or other lining 29, such as is used for brake lining purposes.

From the foregoing then, it will be seen that each of the brake shoes 6 will be simultaneously moved into and out of frictional engagement with the periphery of the brake drum, thus insuring a positive and efficient brake action. It will also be apparent that a brake embodying the features of the present invention is comparatively simple in construction, and at the same time will insure the uniform contact with the brake drum, the segmental shoe arranged to provide an annular brake shoe for contact with substantially the entire peripheral wall of the drum affording greater braking surface than has heretofore been obtained.

Even though I have herein shown and described the preferred embodiment of my invention, it is to be understood that the same is susceptible to changes fully comprehended by the spirit of the invention and the scope of the appended claims.

What is claimed as new is:

1. A brake including in combination a circular arrangement of brake shoes each of which is provided at one end with a tongue, and at its other end with a clip for receiving the tongue on the proximate end of an adjacent brake shoe, each of said shoes being also pivoted adjacent that end thereof provided with the tongue, a ring concentric to said circular series of brake shoes, cam means connecting the pivots of said brake shoes with said ring, and means for actuating said ring for moving said brake shoes radially into and out of braking position.

2. A brake including in combination a drum, a circular series of brake shoes arranged in the drum, each of said shoes being provided at one end with a tongue, and at its other end with a clip for receiving the tongue on the proximate end of an adjacent brake shoe, pivot means for each shoe adjacent one end of the shoe, a cam member rotatable about the axis of the pivot and including a shank, a ring arranged within the confines of said brake shoes, and having a pivotal connection with the shank of said cam, and means for rotating said ring.

3. A brake including in combination a circular series of brake shoes each of which is provided at one end with a tongue, and at its other end with a clip for engaging the tongue on the proximate end of an adjacent brake shoe, means for pivotally mounting the brake shoes adjacent one end thereof, said means including a bolt extending transversely of each brake shoe, cams rotatable about said bolts engageable with the brake shoes, and spring means engaging the cams and the brake shoes for urging said brake shoes into engagement with the faces of the said cams when the shoes are in a retracted position, and means for simultaneously projecting said shoes radially into braking engagement with said drum.

In testimony whereof we affix our signatures.

F. EARL WINCHESTER.
EDGAR B. THOMAS.